United States Patent
Kudo

(10) Patent No.: US 10,953,794 B2
(45) Date of Patent: Mar. 23, 2021

(54) ALERT DEVICE FOR VEHICLES

(71) Applicant: MITSUBISHI JIDOSHA KOGYO KABUSHIKI KAISHA, Tokyo (JP)

(72) Inventor: Yoshihiro Kudo, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/616,227

(22) PCT Filed: Feb. 21, 2018

(86) PCT No.: PCT/JP2018/006108
§ 371 (c)(1),
(2) Date: Nov. 22, 2019

(87) PCT Pub. No.: WO2019/030952
PCT Pub. Date: Feb. 14, 2019

(65) Prior Publication Data
US 2020/0172010 A1 Jun. 4, 2020

(30) Foreign Application Priority Data
Aug. 9, 2017 (JP) .............................. JP2017-154098

(51) Int. Cl.
*B60Q 5/00* (2006.01)

(52) U.S. Cl.
CPC .................................. *B60Q 5/008* (2013.01)

(58) Field of Classification Search
CPC ... B60Q 5/008; B60W 2540/26; B60W 50/14; B60W 2040/0818; B60W 30/09; B60K 28/06; G08G 1/166
See application file for complete search history.

(56) References Cited

U.S. PATENT DOCUMENTS

2003/0006897 A1* 1/2003 Chapin .................... B60Q 1/54
340/466
2012/0130580 A1 5/2012 Omote et al.
(Continued)

FOREIGN PATENT DOCUMENTS

EP 2607170 A1 6/2013
EP 3113172 A2 1/2017
(Continued)

OTHER PUBLICATIONS

Extended European Search Report for European Application No. 18845150.4, dated May 13, 2020.

*Primary Examiner* — Orlando Bousono
(74) *Attorney, Agent, or Firm* — Birch, Stewart, Kolasch & Birch, LLP

(57) ABSTRACT

A loudspeaker 14 outputs a warning sound for announcing the presence of a vehicle to the outside of the vehicle. A travel start detection unit 122 detects travel start of the vehicle. A sound pressure control unit 124 controls sound pressure of the warning sound to be output from the loudspeaker 14, depending on travel status of the vehicle. The sound pressure control unit 124 makes the loudspeaker 14 output the warning sound during stopping of the vehicle, and increases the sound pressure of the warning sound upon detection of travel start of the vehicle. This makes it possible to announce the travel start of a low-noise vehicle such as an electrically powered vehicle, without making the surroundings feel unnatural.

13 Claims, 4 Drawing Sheets

(56) References Cited

U.S. PATENT DOCUMENTS

| | | | | |
|---|---|---|---|---|
| 2015/0191117 A1* | 7/2015 | Arita | ............... | G10K 11/26 |
| | | | | 340/435 |
| 2017/0001559 A1* | 1/2017 | Kwon | ............... | B60Q 5/008 |
| 2017/0043713 A1* | 2/2017 | Sun | ............... | B60Q 5/00 |
| 2017/0096099 A1* | 4/2017 | Matsubara | ............... | G10K 11/178 |
| 2017/0123754 A1* | 5/2017 | Kwon | ............... | G10K 15/02 |
| 2018/0050635 A1* | 2/2018 | Vincent | ............... | B60W 30/095 |
| 2018/0268805 A1* | 9/2018 | Niibe | ............... | H04R 1/28 |
| 2018/0277091 A1* | 9/2018 | Niibe | ............... | B60K 35/00 |
| 2018/0366103 A1* | 12/2018 | Niibe | ............... | B60R 11/0264 |

FOREIGN PATENT DOCUMENTS

| | | |
|---|---|---|
| EP | 3113172 A3 | 1/2017 |
| JP | 2005-343360 A | 12/2005 |
| JP | 2006-321305 A | 11/2006 |
| JP | 2011-246121 A | 12/2011 |
| JP | 2014-008848 A | 1/2014 |
| WO | WO 2011/132347 A1 | 10/2011 |

* cited by examiner

ALERT DEVICE FOR VEHICLES

TECHNICAL FIELD

This invention relates to a vehicle alert device that outputs a warning sound for announcing the presence of a vehicle to the outside of the vehicle.

BACKGROUND ART

Electrically powered vehicles such as electric car and hybrid car are rather silent during low-speed travel, and are unfortunately less recognizable by nearby pedestrians.

For solution to this problem, there has been developed a technique by which a warning sound is output during low-speed travel in order to announce the presence of a vehicle to the outside of the vehicle.

For example, Patent Literature 1 below discloses an alert device for low-noise vehicle, which is designed to issue a warning sound when a vehicle starts travelling, the warning sound stays loud over the initial 5 seconds and then attenuates thereafter. According to Patent Literature 1, a low-level warning sound is designed to be sustained until the vehicle speed exceeds 10 km/h.

CITATION LIST

Patent Literature

[Patent Literature 1] JP-A-2005-343360

SUMMARY OF THE INVENTION

Technical Problem

Although the aforementioned prior art is designed to start output of the warning sound when a vehicle starts travelling, another proposal has been made to output the warning sound also during stopping of the vehicle so as to announce the presence of the vehicle to the surroundings, just like idling sound of engined car.

In a case where the warning sound starts to be issued when the vehicle starts travelling as in the prior art, the pedestrians can easily recognize start of travel of the vehicle since the status switches from sound-OFF to sound-ON upon start of travel of the vehicle. In contrast, when the vehicle issues the warning sound also during the stopping, the pedestrians would feel difficult to recognize start of travel of the vehicle, although the sound pressure changes upon travel start of the vehicle.

Another problem which resides in the case where, as in the prior art, the sound pressure stays loud over a predetermined length of time after the travel start of vehicle and, the sound would be audible as if it stops, when the loud period of sound pressure comes to the end and the sound pressure goes down, making the nearby pedestrians and the driver feel unnatural.

FIG. 5 is a graph illustrating a relationship between the sound pressure of warning sound and the vehicle speed in a prior art.

In FIG. 5, the ordinated plots the sound pressure of warning sound, and the abscissa plots the vehicle speed.

As indicated by a solid line in the drawing, this type of alert device is designed to increase the sound pressure of warning sound as the vehicle speed increases.

Referring now to a case, as indicated by a broken line in the drawing, where the sound pressure stays loud over a predetermined length of time after the travel start of vehicle, a difference $\Delta S$ arises between the sound pressure after the elapse of loud period T3 and the sound pressure having been preset originally. A large difference $\Delta S$ is audible as if the sound suddenly stops, and will make the nearby pedestrians and the driver feel unnatural.

This invention was made considering such situation, whose goal is to announce travel start of low-noise vehicles such as electrically powered vehicles, to nearby pedestrians without making them feel unnatural.

Solution to Problem

Aimed at reaching the goal, according to the invention of claim 1, there is provided a vehicle alert device which includes:

a warning sound output unit that outputs a warning sound for announcing the presence of a vehicle to the outside of the vehicle;

a sound pressure control unit that controls sound pressure of the warning sound to be output from the warning sound output unit, depending on travel status of the vehicle; and a travel start detection unit that detects travel start of the vehicle, the sound pressure control unit making the warning sound output unit output the warning sound during stopping of the vehicle, and increasing the sound pressure of the warning sound upon detection of travel start of the vehicle by the travel start detection unit.

According to the invention of claim 2, there is provided the vehicle alert device, wherein the sound pressure control unit determines the sound pressure, on the basis of sound pressure parameters that specify correlation between travel speed of the vehicle and the sound pressure of the warning sound, and the sound pressure parameters are preset to include a first parameter that gives increase of the sound pressure as the travel speed of the vehicle increases, when applied after the travel start of the vehicle until the time when the travel speed reaches a predetermined speed or above, and a second parameter that gives deceleration when applied after the travel speed of the vehicle reaches the predetermined speed or above.

According to the invention of claim 3, there is provided the vehicle alert device, wherein the first parameter is preset so that the sound pressure at the travel start is nearly vertically raised up from the sound pressure during stopping of the vehicle.

According to the invention of claim 4, there is provided the vehicle alert device, wherein the second parameter is preset so as to keep continuity between the sound pressure during stopping of the vehicle and the sound pressure right before stopping of the vehicle.

According to the invention of claim 5, there is provided the vehicle alert device, wherein the first parameter gives smaller amount of change per unit speed of the sound pressure, than the second parameter gives, and the sound pressure at the predetermined speed given by the first parameter coincides with the sound pressure given by the second parameter at the predetermined speed.

According to the invention of claim 6, there is provided the vehicle alert device, wherein, when the vehicle after the travel start decelerates before reaching the predetermined speed or above, the sound pressure control unit varies the sound pressure according to the first parameter.

According to the invention of claim 7, there is provided the vehicle alert device, wherein, when the vehicle after the travel start decelerates before reaching the predetermined speed or above, the sound pressure control unit gradually varies the sound pressure from the level given by the first parameter to the level given by the second parameter.

Advantageous Effects of Invention

According to the invention of claim 1, since the warning sound is output also during stopping of the vehicle, so that the presence of the vehicle can be announced to the surroundings during stopping of the vehicle. Upon travel start of the vehicle, the sound pressure of warning sound is made louder than that during the stopping of the vehicle, so that the start of travel of the vehicle can be announced to the surroundings.

According to the invention of claim 2, the warning sound pressure is controlled using the first parameter and the second parameter, so that the sound pressure of warning sound may be varied between the point in time when the vehicle starts travelling and other point in time.

According to the invention of claim 3, since the first parameter is preset so that the sound pressure at the travel start is nearly vertically raised up from the sound pressure during stopping of the vehicle, so that the travel start of vehicle can be clearly announced to the surroundings.

According to the invention of claim 4, the second parameter is preset so as to keep continuity between the sound pressure during stopping of the vehicle and the sound pressure right before stopping of the vehicle, so that the sound pressure of warning sound may be shifted without making the surroundings feel unnatural when the vehicle decelerates and finally stops.

According to the invention of claim 5, since the first parameter gives smaller amount of change per unit speed of the sound pressure, than the second parameter gives, so that shifting towards the second parameter may occur without unnaturalness, even when the vehicle decelerates before reaching the predetermined speed. Also since the first parameter and the second parameter come to give same sound pressure at a predetermined speed, so that the shifting from the status given by the first parameter to the status given by the second parameter may occur smoothly.

According to the invention of claim 6, since the sound pressure is varied according to the first parameter when the vehicle decelerates with the first parameter applied, so that the sound pressure will decrease at the same rate of change (increase) as the sound pressure before the deceleration, which is advantageous to change the sound pressure without making the driver feel unnatural.

According to the invention of claim 7, the sound pressure is smoothly varied from the level given by the first parameter to the level given by the second parameter, when the vehicle decelerates with the first parameter applied, making it advantageous to cause smooth shifting towards the sound pressure during stopping of the vehicle, after the vehicle decelerates and then stops.

DESCRIPTION OF EMBODIMENTS

Preferred embodiments of the vehicle alert device according to this invention will be detailed referring to the attached drawings.

Figure 1:
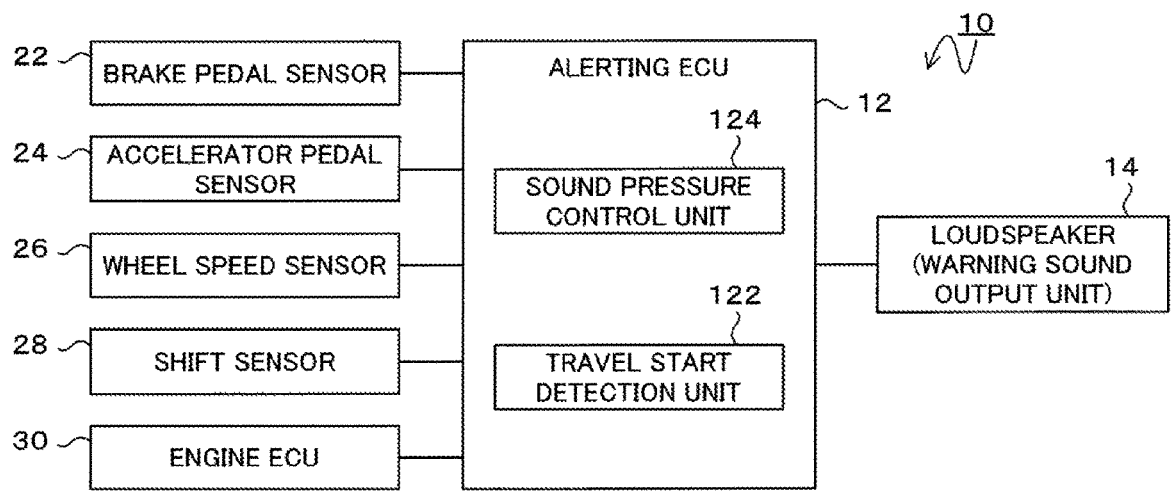
FIG. 1 is a block diagram illustrating a structure of a vehicle alert device 10.

FIG. 1 is a block diagram illustrating a structure of the vehicle alert device 10 according to an embodiment.

In this embodiment, the vehicle alert device 10 is presumed to be mounted on a hybrid vehicle equipped with an engine and a motor (simply referred to as a hybrid vehicle, hereinafter).

The vehicle alert device 10 has an alerting ECU 12 and a loudspeaker (warning sound output unit) 14.

To the alerting ECU 12, connected are a brake pedal sensor 22, an accelerator pedal sensor 24, wheel speed sensors 26, a shift position sensor 28, and an engine ECU 30.

The brake pedal sensor 22 detects an operating status (amount of operation) of a brake pedal (not illustrated) by a driver of the vehicle, and outputs the information to the alerting ECU 12.

The accelerator pedal sensor 24 detects an operating status (amount of operation) of an accelerator pedal (not illustrated) by a driver of the vehicle, and outputs the information to the alerting ECU 12.

The wheel speed sensors 26 are provided to the individual wheels of the vehicle, detect rotating speeds of the individual wheels, and output the information to the alerting ECU 12. On the basis of an average value of the rotating speeds of the individual wheels detected by the wheel speed sensors 26, the alerting ECU 12 calculates the travel speed of vehicle.

The shift position sensor 28 detects an operating status (state of shift setting) of a shift lever (not illustrated) by a driver of the vehicle, and outputs the information to the alerting ECU 12.

The engine ECU 30 controls operations of an engine (not illustrated) of the vehicle. In this embodiment, the alerting ECU 12 particularly acquires, from the engine ECU 30, information regarding whether the engine has stopped or not.

The loudspeaker 14 outputs the warning sound for announcing the presence of the vehicle to the outside of the vehicle. The loudspeaker 14 is arranged at a position, such as in an engine room for example, so that the output warning sound can easily reach the nearby pedestrians or other vehicles. Types of the warning sound output from the loudspeaker 14 are freely selectable, and is typically a sound imitating operating noise of an engine or a motor.

The alerting ECU 12 controls output status of the warning sound output from the loudspeaker 14.

Note that the alerting ECU 12, provided independently in this embodiment, may alternatively perform a process as one functionality of a vehicle ECU which is responsible for the entire control of the vehicle.

The alerting ECU 12 is composed, for example, of a CPU, a ROM that stores and memorizes control program and so forth, a RAM that serves as an operational area for the control program, an EEPROM that stores various data in a rewritable manner, an interface unit that establishes interface with peripheral circuits, and so forth.

The alerting ECU 12 functions as a travel start detection unit 122 and a sound pressure control unit 124, as a result of execution of various programs by the CPU.

The travel start detection unit 122 detects travel start of the vehicle.

The travel start detection unit 122 determines travel start of the vehicle, typically upon detecting that the shift lever is kept in any of ranges other than parking (P-range) and neutral (N-range), and the brake pedal has been released from the depressed position.

For such detection of travel start by the travel start detection unit 122, various known methods are applicable.

For example, the travel start of vehicle may be determined by acquiring position information output from an unillustrated GPS sensor, and by detecting a change of the position information of the vehicle from the stopping state (a state in which the position was kept unchanged over a predetermined length of time).

The travel start of vehicle may be determined alternatively by detecting a change of a detection value (wheel rotating speed) acquired by the wheel speed sensor 26, from zero to a value exceeding zero.

In another exemplary case with an automatic brake holding function (a function for keeping the brake pedal depressed even if a foot was lifted off therefrom during stopping, to automatically sustain the stopping state), the travel start of vehicle may be determined when the accelerator pedal was stepped down by the foot having been kept lifted off from the brake pedal, to change a value of vehicle speed pulse, that is, when such release of the automatic brake holding was detected. The travel start of vehicle may still alternatively be detected on the basis of an automatic holding release signal that is output by the ECU that controls the automatic brake holding function.

Even more alternatively, for a vehicle that can be automatically driven following a preceding vehicle, the travel start (or travel start scheduled within a short time) of the own vehicle may be determined when the preceding vehicle, having been in the stopping state, was detected to start, while monitoring motion of the preceding vehicle with a radar, camera or the like.

The sound pressure control unit 124 controls the sound pressure of warning sound output from the loudspeaker 14 (warning sound output unit), on the basis of the travel status of vehicle.

First, a basic control process carried out by the sound pressure control unit 124 will be explained. The sound pressure control unit 124 makes the loudspeaker 14 output the warning sound, when the travel speed of vehicle is low (below second predetermined speed V2). Most hybrid vehicles at low speeds can travel while being powered by motor only, without activating the engine. The motor emit operating sound smaller than that of the engine, so that the vehicle would not be recognized by nearby pedestrians. Hence, the warning sound is issued from the loudspeaker 14 in order to announce the presence of vehicle. Note that the warning sound is not necessarily output when the engine is in operation typically for the purpose of power generation, even during low-speed travel.

When the travel speed of vehicle reaches middle to high speeds (above second predetermined speed V2), output of the warning sound is stopped since road noise of tires and wind noise of vehicle body will be large enough.

The sound pressure control unit 124 makes the loudspeaker 14 output the warning sound, also during stopping of the vehicle. This is because the announcement of the presence of vehicle to the surroundings, also in the stopping state, is expected to enhance safety.

Note that the vehicle during stopping means vehicle that temporarily stops during the travel, for waiting at traffic lights or due to traffic jam. The warning sound therefore need not be issued when the shift lever is positioned into parking (P-range), even if the vehicle is in the stopping state.

The sound pressure control unit 124 increases the sound pressure of warning sound, upon detection of the travel start of vehicle by the travel start detection unit 122, to a level higher than that during stopping. The amount of change of sound pressure in this case is preferably set to a degree by which the sound pressure during stopping of vehicle is clearly discriminable from the sound pressure after the travel start. In this way, the travel start of the vehicle, having been stopped, can be announced to the surroundings.

Now the sound pressure control unit 124 determines the sound pressure of warning sound to be output from the loudspeaker 14, on the basis of sound pressure parameters that specify correlation between travel speed of the vehicle and the sound pressure of warning sound.

Figure 2:
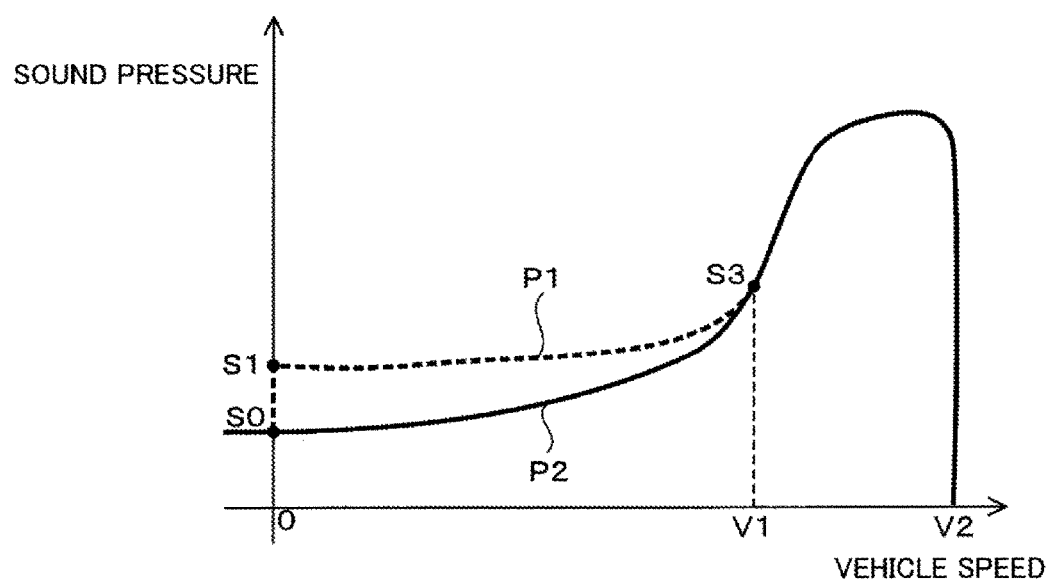
FIG. 2 is a graph illustrating exemplary sound pressure parameters.

FIG. 2 is a graph illustrating exemplary sound pressure parameters.

In FIG. 2, the ordinated plots the sound pressure of warning sound, and the abscissa plots the vehicle speed.

The sound pressure parameter is designed to increase as the travel speed of vehicle increases until getting closer to the second predetermined speed V2. At or above the second predetermined speed V2, output of the warning sound is stopped, since traveling sound of the vehicle will be large enough as described above.

The sound pressure parameter is also set to the zero point of travel speed, which corresponds to the vehicle during stopping, letting now the sound pressure of warning sound during stopping of vehicle be S0.

There are two parameters P1 and P2 preset in a range over which the travel speed exceeds 0 and grows up to a first predetermined speed V1.

The first parameter P1 is applied over a duration from when the vehicle having been stopped starts travelling, up to when the travel speed grows up to the first predetermined speed V1 or above (up to a level below the first predetermined speed V1). The second parameter P2 is applied over a duration in which the first parameter is not applied, for example in a case where the travel speed exceeds the first predetermined speed V1, or in a case where the travel speed once reached or exceeded the first predetermined speed V1, and then decelerated down below the first predetermined speed V1, that is, in a case where the travel speed of vehicle is once raised up to or above the first predetermined speed V1, followed by deceleration.

The second parameter P2 is given by a curve continued from the sound pressure S0 during stopping. That is, the sound pressure S0 during stopping of vehicle and the sound pressure right before stopping are preset so as to keep continuity.

In contrast, the first parameter P1 is given so that the sound pressure S1 at the travel start is nearly vertically raised up, from the sound pressure S0 during stopping of the vehicle. As described above, the first parameter P1 is applied when the vehicle starts travelling from the stopping state. Hence, when the vehicle starts travelling from the stopping state, the sound pressure of warning sound then jumps from S0 up to S1 instantaneously. The difference between the sound pressure S0 during stopping and the sound pressure S1 at the travel start is preset to a degree discriminable by the nearby pedestrians, where the sound pressure S1 at the travel start is set larger.

The first parameter P1 gives smaller amount of change per unit speed of the sound pressure, than the second parameter P2 gives, that is, the first parameter P1 is given by a gentler curve. The first parameter P1 gives the same sound pressure as the second parameter P2 gives at the first predetermined speed V1. In other words, sound pressure (S3) given by the first parameter P1 at the first predetermined speed V1 coincides with the sound pressure (S3) given by the second parameter P2 at the first predetermined speed V1.

In this way, it now becomes possible to announce the travel start of vehicle to the surroundings, with clear discrimination between the sound pressure S0 during stopping and the sound pressure S1 after the travel start, and to vary the warning sound without making the nearby pedestrians or the driver feel unnatural, by smoothening the change of sound pressure when the travel speed of vehicle reaches the first predetermined speed V1 or above, or when the vehicle decelerates and comes into the stopping state.

In a case where the vehicle starts traveling from the stopping state, and then decelerates before reaching the first predetermined speed V1 or above (below first predetermined speed V1, with the first parameter P1 applied), possible controls are as follows.

<Method 1> Decrease Sound Pressure According to First Parameter P1.

In this case, the sound pressure will smoothly vary as the vehicle speed increases, and can be varied without unnaturalness even if the vehicle accelerates thereafter.

Note however that, when the vehicle stops, the warning sound will fall down to the sound pressure S0 nearly vertically.

<Method 2> Gradually Control Sound Pressure to Level Given by Second Parameter P2.

Figure 3:
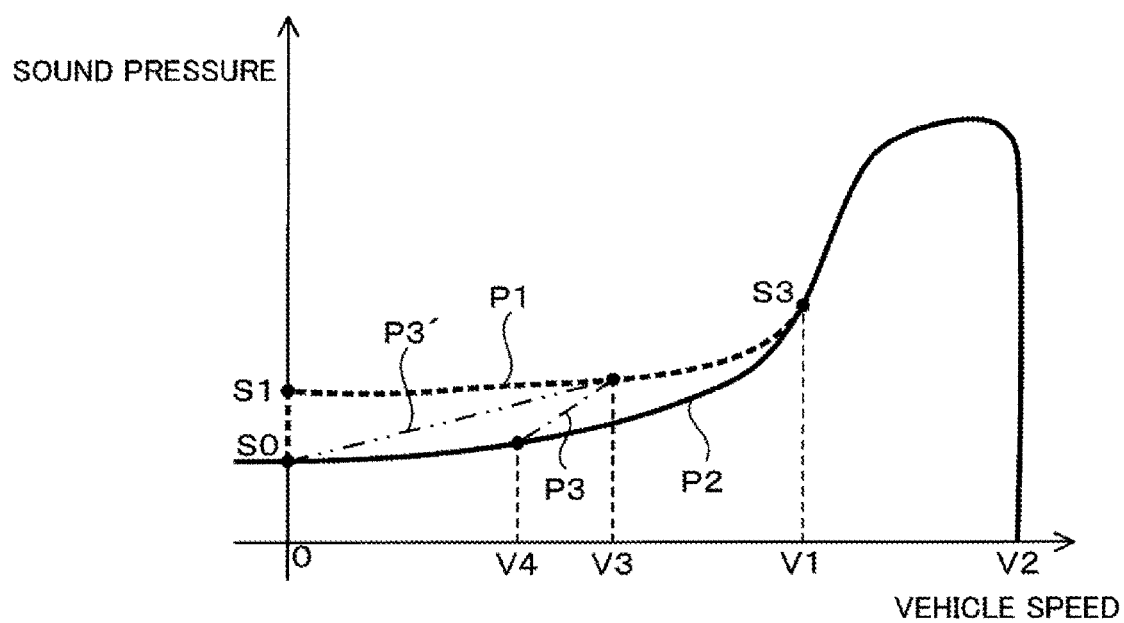
FIG. 3 is a graph illustrating exemplary sound pressure parameters.

That is, as illustrated in FIG. 3, a third parameter P3 that bridges the first parameter P1 and the second parameter P2 is set, and the sound pressure is varied according to the third parameter P3.

In other words in Method 2, in a case where the vehicle starts traveling, and then decelerates before reaching the first predetermined speed V1 or above, the sound pressure given by the first parameter P1 will smoothly shift to the sound pressure given by the second parameter P2. Also in an exemplary case where the vehicle decelerates, and then be re-accelerates rather than stops, the sound pressure is varied according to the third parameter P3.

In the example illustrated in FIG. 3, the vehicle starts traveling, then starts to decelerate at the travel speed V3 (<V1), wherein the second parameter P2 and the third parameter P3 travel give the same sound pressure at speed V4 (>0).

Alternatively, another third parameter P3', again as illustrated in FIG. 3, may give the same result as the second parameter P2 gives at a travel speed of zero, that is, the when the vehicle is in the stopping state.

When Method 2 is applied, the sound pressure will shift so as to keep continuity (smoothly) to the sound pressure S0 during stopping, when the vehicle decelerates, and then finally stops.

Another possible way is to normally employ Method 2, and to vary the sound pressure according to the first parameter P1, if stopping and low-speed travel (traveling at a speed below the predetermined speed V1) are repeated within a short time typically due to traffic jam.

Conditions for judging the repetition are exemplified by a case where stopping (deceleration) and start are repeated the predetermined number of times or more within a predetermined length of time T1, and a case where an interval between stopping (deceleration) and start is equal to or shorter than a predetermined length of time T2.

Figure 4:
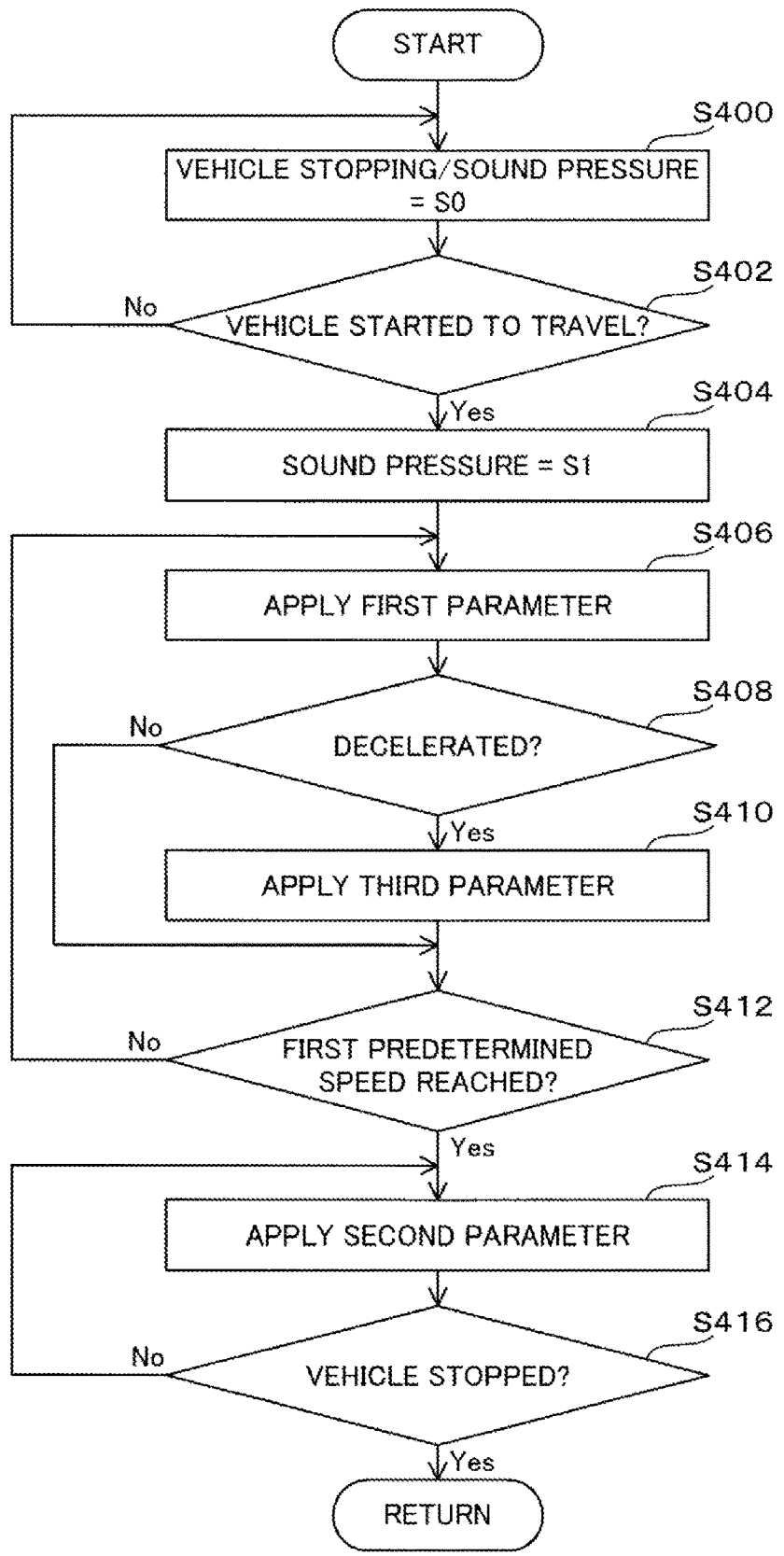
FIG. 4 is a flowchart illustrating operation procedures of the vehicle alert device 10.
Figure 5:
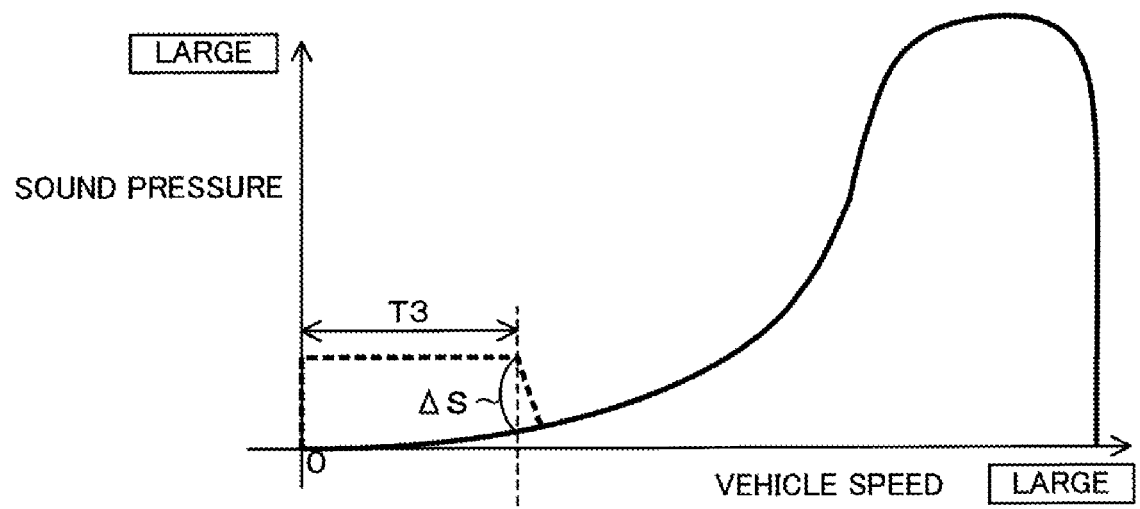
FIG. 5 is a graph illustrating an exemplary relationship between sound pressure of warning sound and vehicle speed.

FIG. 4 is a flowchart illustrating operation procedures of the vehicle alert device 10.

In this flowchart, a control process for the vehicle, which starts travelling, and then decelerates before reaching the first predetermined speed V1 (with the first parameter P1 applied), will be explained referring to <Method 2> above.

The vehicle in the initial state is presumed to be in the stopping state. During stopping of the vehicle, the sound pressure control unit 124 makes the loudspeaker 14 output the warning sound with the sound pressure S0 (Step S400).

Until the travel start of vehicle is detected by the travel start detection unit 122 (Step S402: "No" loop), the process goes back to Step S400 to keep outputting the warning sound with the sound pressure S0.

Upon detection of the travel start of vehicle (Step S402: Yes), the sound pressure control unit 124 controls the sound pressure of warning sound according to the first parameter P1. That is, immediately after the travel start, the control takes place to output the warning sound with the sound pressure S1 at the travel start (Step S404), and thereafter to output the warning sound with a sound pressure specified by the travel speed of vehicle and the first parameter P1 (with the first parameter P1 applied) (Step S406).

If the vehicle decelerates (Step S408: Yes) before the travel speed of vehicle reaches the first predetermined speed V1 (see Step S412), the sound pressure control unit 124 sets the third parameter P3 that bridges a point (sound pressure) given by the first parameter P1 corresponded to the travel speed at that time and the second parameter P2, and then varies the sound pressure of warning sound according to the third parameter P3 (with the third parameter P3 applied) (Step S410).

Until the travel speed of vehicle reaches the first predetermined speed V1 (Step S412: "No" loop), the process goes back to Step S406, and keeps outputting the warning sound with the sound pressure given by the first parameter P1.

When the third parameter P3 is applied in Step S410, the third parameter P3 is kept applied until the first predetermined speed V1 is reached.

When the travel speed of vehicle reaches the first predetermined speed V1 (Step S412: Yes), the sound pressure control unit 124 controls the sound pressure of warning sound according to the second parameter P2 (with the second parameter P2 applied) (Step S414).

For example, even in a case where the travel speed of vehicle then decelerates down below the first predetermined speed V1, the sound pressure control unit 124 controls the sound pressure of warning sound according to the second parameter P2. The second parameter P2 gives a curve continued from the sound pressure S0 during stopping, making it possible to shift the sound pressure smoothly to the sound pressure S0, even if the vehicle decelerates and then stops.

Meanwhile, if the travel speed of vehicle reaches the third predetermined speed V3 or above, the sound pressure control unit 124 stops outputting the warning sound. If the travel speed decreases down below the third predetermined speed V3, the warning sound is output again according to the second parameter P2.

Until the vehicle stops (Step S416: "No" loop), the process goes back to Step S414 to continue application of the second parameter P2. When the vehicle stops (Step S416: Yes), the process goes back to Step S400 to repeat the steps thereafter.

As has been described above, the vehicle alert device 10 of this embodiment outputs the warning sound also during stopping of vehicle, making it possible to announce the presence of the vehicle also during stopping of the vehicle to the surroundings. In addition, since the sound pressure of warning sound at the travel start of vehicle is increased from the level during the stopping of vehicle, so that the travel start of vehicle may be announced to the surroundings.

Also since the vehicle alert device 10 controls the warning sound pressure using the first parameter P1 and the second parameter P2, so that the sound pressure of warning sound may be varied between the point in time when the vehicle starts travelling and other point in time. Also since the first parameter P1 gives the sound pressure S1 at the travel start nearly vertically raised up from the sound pressure S0 during stopping of vehicle, so that the travel start of vehicle can be announced clearly to the surroundings.

Also since the vehicle alert device 10 have the second parameter preset so as to keep continuity between the sound pressure during the stopping of vehicle and the sound pressure right before the stopping of vehicle, so that the sound pressure of warning sound can be shifted without unnaturalness, even when the vehicle decelerates to finally stop.

Also since the vehicle alert device 10 has the first parameter P1 and the second parameter P2 preset to give same sound pressure at the first predetermined speed V1, so that the shifting from the status given by the first parameter P1 to the status given by the second parameter 2 may occur smoothly.

When the vehicle decelerates with the first parameter applied, the sound pressure can be decreased at the same rate of change (increase) as the sound pressure before the deceleration, by varying the sound pressure according to the first parameter P1, making the vehicle alert device 10 advantageous to vary the sound pressure without making the driver feel unnatural.

When the vehicle decelerates with the first parameter P1 applied, the sound pressure may be smoothly varied from the level given by the first parameter P1 to the level given by the second parameter P2, making the vehicle alert device 10 advantageous to cause smooth shifting towards the sound pressure during the stopping of vehicle, after the vehicle decelerates and then stops.

REFERENCE SIGNS LIST 10 vehicle alert device
12 alerting ECU
122 travel start detection unit
124 sound pressure control unit
14 loudspeaker (warning sound output unit)
22 brake pedal sensor
24 accelerator pedal sensor
26 wheel speed sensor
28 shift position sensor
30 engine ECU
P1 first parameter
P2 second parameter
S0 sound pressure during stopping
S1 sound pressure at travel start

The invention claimed is:

1. A vehicle alert device comprising:
   a warning sound output unit outputting a warning sound for announcing the presence of a vehicle to the outside of the vehicle;
   a sound pressure control unit controlling sound pressure of the warning sound to be output from the warning sound output unit, depending on travel status of the vehicle; and
   a travel start detection unit detecting travel start of the vehicle,
   the sound pressure control unit making the warning sound output unit output the warning sound during stopping of the vehicle, and increasing the sound pressure of the warning sound upon detection of travel start of the vehicle by the travel start detection unit,
   wherein the sound pressure control unit determines the sound pressure, on the basis of sound pressure parameters that specify correlation between travel speed of the vehicle and the sound pressure of the warning sound, and
   the sound pressure parameters are preset to include a first parameter that gives increase of the sound pressure as the travel speed of the vehicle increases, when applied after the travel start of the vehicle until a time when the travel speed reaches a predetermined speed or above, and a second parameter that gives deceleration when applied after the travel speed of the vehicle reaches the predetermined speed or above.

2. The vehicle alert device according to claim 1, wherein the first parameter is preset so that the sound pressure at the travel start is nearly vertically raised up from the sound pressure during stopping of the vehicle.

3. The vehicle alert device according to claim 1, wherein the second parameter is preset so as to keep continuity between the sound pressure during stopping of the vehicle and the sound pressure right before stopping of the vehicle.

4. The vehicle alert device according to claim 3, wherein the first parameter gives smaller amount of change per unit speed of the sound pressure, than the second parameter gives, and
   the sound pressure at the predetermined speed given by the first parameter coincides with the sound pressure given by the second parameter at the predetermined speed.

5. The vehicle alert device according to claim 1, wherein, when the vehicle after the travel start decelerates before reaching the predetermined speed or above, the sound pressure control unit varies the sound pressure according to the first parameter.

6. The vehicle alert device according to claim 1, wherein, when the vehicle after the travel start decelerates before reaching the predetermined speed or above, the sound pressure control unit gradually varies the sound pressure from the level given by the first parameter to the level given by the second parameter.

7. The vehicle alert device according to claim 2, wherein the second parameter is preset so as to keep continuity between the sound pressure during stopping of the vehicle and the sound pressure right before stopping of the vehicle.

8. The vehicle alert device according to claim 2, wherein, when the vehicle after the travel start decelerates before reaching the predetermined speed or above, the sound pressure control unit varies the sound pressure according to the first parameter.

9. The vehicle alert device according to claim 3,
wherein, when the vehicle after the travel start decelerates before reaching the predetermined speed or above, the sound pressure control unit varies the sound pressure according to the first parameter.

10. The vehicle alert device according to claim 4,
wherein, when the vehicle after the travel start decelerates before reaching the predetermined speed or above, the sound pressure control unit varies the sound pressure according to the first parameter.

11. The vehicle alert device according to claim 2,
wherein, when the vehicle after the travel start decelerates before reaching the predetermined speed or above, the sound pressure control unit gradually varies the sound pressure from the level given by the first parameter to the level given by the second parameter.

12. The vehicle alert device according to claim 3,
wherein, when the vehicle after the travel start decelerates before reaching the predetermined speed or above, the sound pressure control unit gradually varies the sound pressure from the level given by the first parameter to the level given by the second parameter.

13. The vehicle alert device according to claim 4,
wherein, when the vehicle after the travel start decelerates before reaching the predetermined speed or above, the sound pressure control unit gradually varies the sound pressure from the level given by the first parameter to the level given by the second parameter.

* * * * *